DIFFERENTIATOR CIRCUIT USING A PAIR OF CURRENT SWITCHING TRANSISTORS

Filed June 25, 1965 2 Sheets-Sheet 1

Fig. 1. A.

INVENTOR.
AMRAM RASIEL
BY Cadwallader, Kelly & Dacey
ATTORNEYS

INVENTOR.
AMRAM RASIEL
BY Cadwallader, Kelly & Deacey
ATTORNEYS

United States Patent Office 3,411,016
Patented Nov. 12, 1968

3,411,016
DIFFERENTIATOR CIRCUIT USING A PAIR OF CURRENT SWITCHING TRANSISTORS

Amram Rasiel, Manchester, Mass., assignor to EG & G, Inc., a corporation of Massachusetts Filed June 25, 1965, Ser. No. 466,993
4 Claims. (Cl. 307—229)

ABSTRACT OF THE DISCLOSURE

A semiconductor circuit using two current control devices, preferably transistors, with their emitters connected at a common point so as to share a common impedance and having an inductor connected between the output electrodes of the two current control devices. Cross coupling is provided to produce sharp differentiation of the input waveform.

The present invention relates generally to differentiator circuits and, more particularly, to an improved differentiator circuit for driving push-pull oscillators or for being used as a shaping circuit.

Differentiator circuits are known in the prior art for use in driving push-pull oscillators or for use in devices for which two inputs are required. One of the difficulties encountered with devices of this type known in the prior art is that owing to unequal loading at the respective outputs, the outputs are both unequal in amplitude and do not give sharp differentiation. Moreover, the input is not isolated from the output, preventing the use of coaxial cables at the input.

The present invention contemplates the provision of an improved differentiator circuit which overcomes the defects of differentiator circuits of the prior art. The differentiator circuit of the invention produces very sharp differentiation at the outputs in a manner that the input is completely isolated from the output. The differentiator circuit of the invention is furthermore most useful as a shaping circuit for low amplitude pulses with relatively slow rise and fall times.

It is, threfore, an object of the present invention to provide a differentiator circuit which gives sharp differentiation at the output, even with low amplitude input pulses whose rise and fall times are relatively slow.

It is another object of the present invention to provide a differentiator circuit in which the input is completely isolated from the output.

It is another object of the present invention to provide a differentiator circuit that is useful also as a shaping circuit.

A still further object of the present invention is to provide a differentiator circuit which is very simple for the result it achieves.

Other and further objects of the invention will in part be obvious and will in part appear hereinafter.

In general, the invention contemplates the provision of an improved differentiator circuit for producing differentiated pulses or pips, corresponding to the leading and trailing edges of th input pulses, and comprising a pair of semiconductor current control devices arranged as a current switching pair in which each of the devices is provided with input, output and control electrodes for varying the conductivity of a current flow path between the input and output electrodes of the respective devices, and in which an impedance element such an inductor, is connected between the output electrodes of the devices.

The invention accordingly comprises the improved differentiator circuit prossessing the construction, combination of elements, and arrangement of parts which are exemplified in the following detailed disclosure, and the scope of which will be indicated in the appended claims.

For a fuller understanding of the nature and objects of the invention, reference should be had to the following detailed description, taken in connection with the accompanying drawings, wherein:

FIG. 1A depicts, on an enlarged scale, a positive output pip as obtained at one of the outputs of the circuit of the invention;

Figure 1:
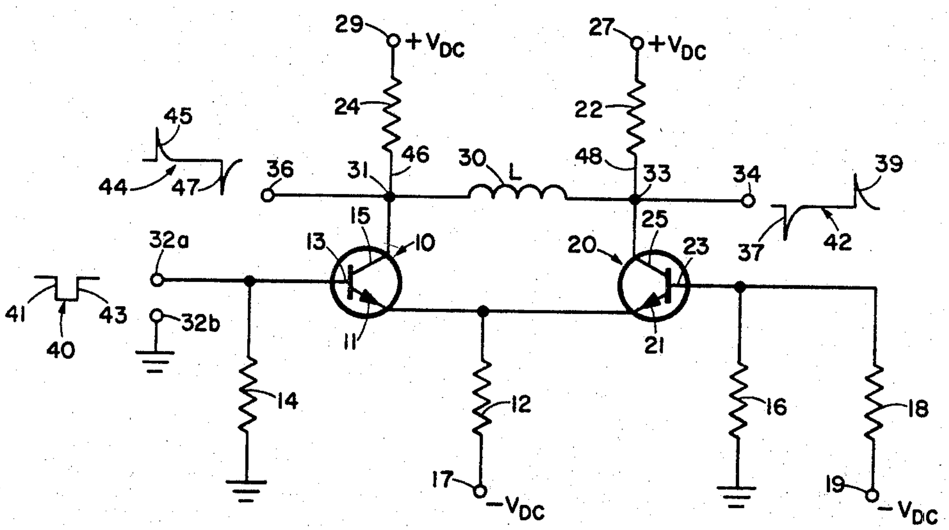
FIG. 1 is a schematic representation of a differentiator circuit constructed in accordance with and embodying the present invention.

Referring to the drawings in which like reference characters refer to like parts throughout and in particular to FIG. 1, the reference characters 10 and 20 denote a pair of semiconductor current control devices, such as NPN transistors. Each of the transistors 10 and 20 is provided with input or emitter electrodes 11, 21, output or collector electrodes 15, 25, and control or base electrodes 13, 23, respectively. As may be observed, the emitter electrodes 11 and 21 of the two transistors 10 and 20 are directly connected to one another and to one end of a common emitter dropping resistor 12, the free end of which is connected to a negative terminal 17 of a suitable source of direct current potential, $-V_{DC}$.

It will be further noted that the collector electrode 15 of the transistor 10 is connected via conductor 46 and a resistor 24 to a positive terminal 29 of a suitable biasing source of direct current potential. $+V_{DC}$. In like manner, the collector 25 of transistor 20 is connected via conductor 48 and a resistor 22 to a positive terminal 27 of a suitable biasing source of direct current potential, $+V_{DC}$. A suitable impedance element, such as an inductor 30, is connected between the collector electrodes 15 and 25 through junctions 31 and 33. The ouput terminals of the circuit 34 and 36 are likewise connected to these junctions 33 and 31 respectively on the conductors 48 and 46. The control electrodes or bases 13 and 23 of the transistors are furthermore referenced to ground through resistors 14 and 16 respectively. To keep one of the pair of transistors normally in a nonconducting or cut-off state, the base electrode 23 of the transistor 20 is furthermore connected through a resistor 18 to a negative terminal 19 of a suitable biasing source of direct current potential, $-V_{DC}$. One terminal 32*a* of a pair of input terminals is connected directly to the base electrode 13 of the normally conducting transistor 10, while the other terminal 32*b* is returned to ground. Thus, the differentiator circuit as shown in and described with reference to FIG. 1 is essentially a monostable configuration of a current switching pair in which the output electrodes are directly coupled to one another by an inductor, and in which negative input pulses applied at the input terminals will switch the state of conduction of the pair of transistors.

It is to be understood, of course, that PNP transistors may equally well be utilized in the differentiator circuit of the invention, provided the polarities of the indicated biasing sources of potentials are reversed.

In order to explain the operation of the embodiment of the differentiator circuit shown in and described with reference to FIG. 1, the following values have been assumed for the various circuit elements. By way of example, each of the resistors 22 and 24 may have a value of 250 ohms, while the resistors 14 and 16 each has a value of 50 ohms. The emitter dropping resistor 12 should be high, preferably 2K, while the base biasing resistor 18 may be of the value of 4.7K. The value of the inductor 30 may be of the order of one microhenry. It is further assumed that the value of the input pulse 40 may be as follows: a range of amplitude from about —0.4 volt to about —3 volt, and normally being about —2 volt; a pulse duration of about 3 nanoseconds and up; with the pulse repetition rate depending on the impedance being driven and being typically between 0 to 50 million pulses per second. It is further assumed that terminals 27 and 29 are at +6 volts potential, while terminals 17 and 19 are at —20 volts potential. It is to be noted the collector electrodes 15 and 25 of the pair of transistors are direct-current-wise always referenced to the same potential. It is to be further noted that transistor 20 is normally biased off, i.e., nonconducting, while transistor 10 is fully on and conducting. It will be apparent, therefore, that current flows through the circuit including resistor 24, transistor 10 and resistor 12, and a current will also flow through the circuit including resistor 22, to the junction 33, hence through the inductor 30, the junction 31 through the transistor 10 and resistor 12. The current flowing in the inductor 30 corresponds to the current flowing through the resistor 22.

Under the conditions assumed above, let us consider the case in which a pulse 40 of about 3 nanoseconds duration and having an amplitude of —2 volts is applied to the input terminals **32*a* and 32*b*. As soon as the leading edge 41 of the input pulse 40 is applied to the base electrode 13 of the transistor 10, it causes its base-emitter junction to be reverse-biased, driving thereby the transistor 10 to cut-off. With conduction ceasing through the transistor 10, its collector potential sharply rises, resulting in the appearance at the output 36 of a positive pulse or pip 45, forming one portion of the output waveform 44, which corresponds to the leading edge 41 of the input pulse 40. Simultaneously with the transistor 10 being driven to cut-off, transistor 20 is driven into conduction. As the state of conduction of the pair of transistors 10 and 20 switches, the current through the inductor 30 will also reverse its direction as determined by the time constant of the circuit. With the transistor 20 becoming suddenly conducting, a negative-going output pulse or pip 37 will appear at the output 34, which also corresponds, as may be observed on the output waveform 42, to the leading edge 41 of the input pulse. It must be pointed out that the current driven into the inductor 30 is current flowing from one or the other of the collectors 15 and 25, with the collectors serving as the current source, resulting in very sharp differentiated output pulses or pips 45 and 37. It must also be pointed out that these two output pulses or pips 45 and 37 are of the same amplitude but opposite polarity with reference to the quiescent output. It should also be noted that the input pulse 40 is completely isolated from the output pulses or pips 45 and 37. Consequently, the input terminals 32*a* and 32*b*, when using a proper resistor 14 from the base 13 of the transistor 10** to ground, may properly terminate in a coaxial cable without any reflections into the input and without showing at the input any of the output waveforms.

In FIG. 1A is shown on an enlarged scale, the positive output pulse or pip 45 shown in FIG. 1. The time of decay of this output pulse 45, as indicated by the letter *d*, is determined by the ratio of the value of the inductor 30 to the value of the resistor 24. Thus, by properly selecting the values of the resistors 22 and 24 in relation to the value of the inductor 30, the time of decay of the output pulses may be appropriately lengthened or shortened, as may be desired.

When the trailing edge 43 of the input pulse 40 appears at the base electrode 13 of the transistor 10, it will cause the pair of transistors to switch their states of conduction once again. More specifically, the transistor

10 is taken out of its nonconductivity or off state by the removal of the reverse bias on its base-emitter junction and, simultaneously therewith, the other transistor 20 is cut off. Consequently, a negative-going pulse or pip 47 will appear at the output 36, while a positive-going pulse or pip 39 will appear at the output 34. This is due once again to a reversal of the direction of current flowing through the inductor 30, with the collector 15 acting as the current source. It will be readily apparent to those skilled in the art that by lengthening the duration of the input pulse 40, the output waveforms 42 and 44 will correspondingly become lengthened, since the output pulses 45 and 37 always represent the leading edge 41 of the input pulse, while the output pulses 47 and 39 always represent the trailing edge 43 of the input pulse.

Figure 2:
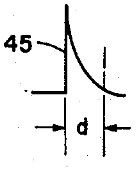
FIG. 2 is a representation similar to that shown in FIG. 1, but arranged to be driven by positive input pulses rather than negative input pulses.
Figure 2:
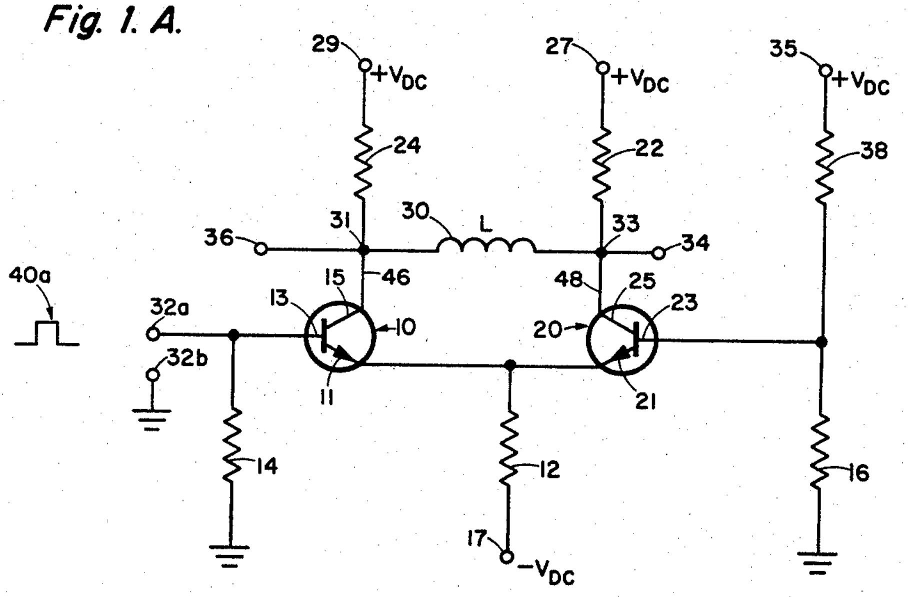

FIG. 2 is a schematic representation of a differentiator circuit similar to that shown in and described with reference to FIG. 1, but is arranged in such a manner that in the normal condition, transistor 20 is biased into conduction and transistor 10 is cut off. This is achieved by connecting a positive-biasing source of potential, $+V_{DC}$, at terminal 35 to which is connected the control electrode 23 of transistor 20 via resistor 38. With the transistors 10 and 20 being NPN transistors, an input pulse **40*a* of positive polarity is now required to be applied at the input terminals 32*a* and 32*b*. The application of the leading edge of this positive pulse 40a will cause the base-emitter junction of the heretofore cut-off transistor 10 to become forward biased and conductive. The direction of current through the inductor 30 will once again change, and with the transistor 20 now becoming cut-off, differentiated output pulses or pips will once again appear at the output terminals 34 and 36**, but will now face in the opposite direction from that shown in FIG. 1. Otherwise, the operation of the circuit is the same as already described with reference to FIG. 1.

Figure 3:
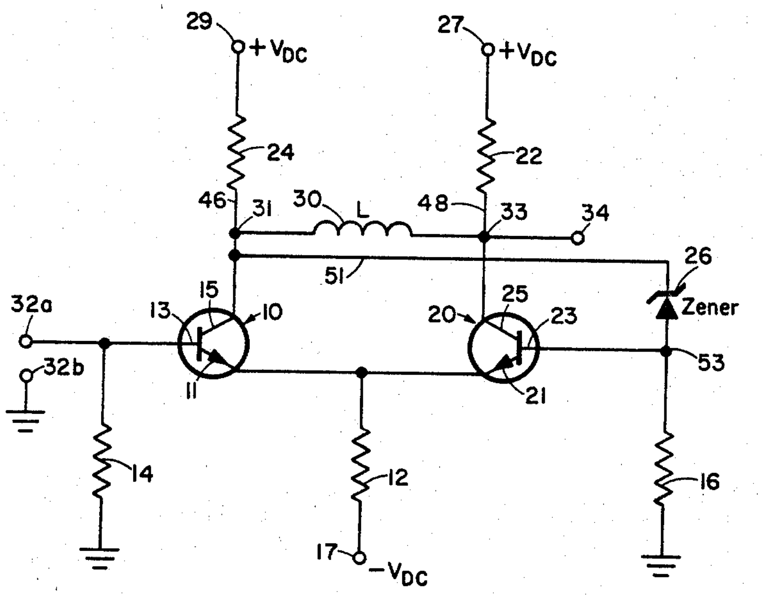
FIG. 3 is a schematic representation of a different embodiment of the differentiator circuit of the invention for use primarily as a shaping circuit.
Figure 4:
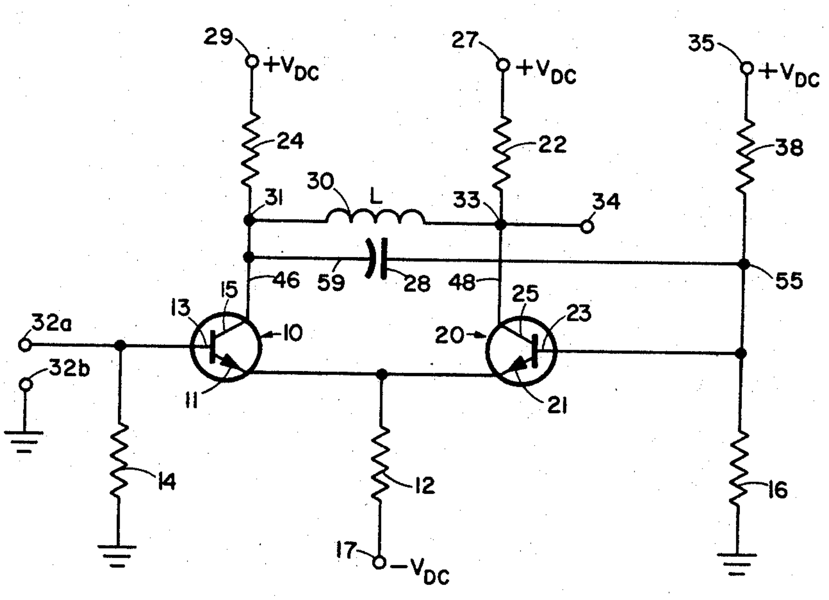
FIG. 4 is a representation similar to that shown in FIG 3, but incorporating a further modification.

The embodiments shown in FIGS. 3 and 4 represent differentiator circuits primarily for use as shaping circuits whose responses are both faster and sharper than the circuits disclosed in FIGS. 1 and 2. Thus, the circuits of FIGS. 3 and 4 give very sharp differentiation at the output, and they do have only a single output, even with low amplitude input pulses whose rise and fall times are relatively slow. Both circuits shown in FIGS. 3 and 4 involve essentially a modification of the circuits shown in and described with reference to FIGS. 1 and 2 in that the collector electrode of the driven transistor of the pair of transistors is coupled by either a direct current or an alternating current means to the base electrode of the other transistor. The output is now obtained only from the collector of the non-driven transistor. The coupling of the collector of the driven transistor to the base of the non-driven transistor provides regeneration and consequently a sharpening of the output pulses or pips, due to the much faster response at the collector electrodes.

As may be noted, the circuit of FIG. 3 is similar to that shown in and described with reference to FIG. 1, except that the collector electrode 15 of the transistor 10 is now connected through conductor 51 and Zener diode 26 to a junction 53 on the base or control electrode 23 of the non-driven transistor 20. Consequently, only one output 34, taken from the collector 25 of the non-driven transistor, is now available. With the indicated values assumed by way of example with reference to FIG. 1, the Zener diode 26 may be chosen preferably to have a reverse breakdown voltage characteristic of +5.6 volts. As a result, normally the transistor 20 is biased into conduction and transistor 10 is cut-off. Positive pulses are consequently needed to be applied at the pair of input terminals **32*a* and 32*b* to switch the states of conduction of the transistors in like manner as already described above. A relatively slowly rising input pulse, however, will still result in very sharply differentiated pulses to appear at the output 34, since the slightest forward-biasing of the base-emitter junction of the normally nonconducting transistor 10, allowing even slight conduction through this transistor, will immediately transmit a negative-going pulse to the base electrode 23 of the normally conducting transistor 20, so as to reverse-bias its base-emitter junction and, in fact, drive it to cut-off. It should be noted in this regard that the cathode of the Zener diode 26 is connected to the collector 15, while the anode of the Zener diode 26 is connected directly to the base 23**.

Since the normally conducting transistor 20 is thus rendered very quickly nonconductive, the consequent output pulse appearing at terminal 34 will be a very sharp positive-going pulse. This same fast switching action also results with the trailing edge of the input pulse allowing once again transistor 10 to come out of conduction, with the consequent increase in potential at the collector 15 in a positive direction being immediately coupled through the Zener diode 26 to the base 23, once again forward biasing the base-emitter junction of transistor 20, and rendering it fully conductive. As a result, a very sharp negative-going pulse will appear at the output terminal 34.

The operation of the circuit shown in FIG. 4 is essentially the same as that described with reference to FIG. 3, but in lieu of a Zener diode here is shown an alternating-current cross coupling means such as a capacitor 28 connecting the collector electrode 15 of the transistor 10 directly to the base electrode 23 of the other transistor 20. As may be noted, one side of the capacitor 28 is connected by lead 59 to the conductor 46, while the other side of the capacitor 28 is connected to a junction 55 coupled to the base 23. With the values assumed by way of example for the various circuit elements as described with reference to FIG. 1, it may be assumed that capacitor 28 has a value of about 2,000 picofarads.

The present invention thus provides an improved differentiator circuit that is useful for driving push-pull oscillators by providing very sharply differentiated output pulses at two of its output terminals, or for providing a differeniator circuit having only a single output terminal which circuit may be most useful as a shaping circuit to provide sharply differentiating output pips even with low amplitude input pulses whose rise and fall times are relatively slow.

Since certain changes may readily suggest themselves to those skilled in the art above described differentiator circuit of the invention without departing from the scope of the invention herein involved, it is intended that all matter contained in the above description or shown in the accompanying drawings shall be interprated in an illustrative and not in a limiting sense.

What is claimed is:

1. A differentiator circuit comprising:

first and second semiconductor current control devices, each having at least a base, an emitter and collector electrodes;

the emitter electrodes connected to each other and to a first source of potential;

an inductor;

each end of the inductor connected to respective collector electrodes;

a second source of potential connected to each collector electrode;

signal input terminals connected to the base electrode of the first control device;

first resistor means connected between the base electrode of the first control device and ground potential to maintain the first control device in a given state of conduction in the absence of a signal at the input terminals thereof;

a pair of series resistors connected between one of the sources and ground potential;

means connecting the base electrode of the second control device to the common junction between the pair of series connected resistors to maintain the second control device in an opposite state of conduction in the absence of a signal at the input terminals of the first control device; and output terminals connected to at least one collector electrode.

2. The differentiator circuit of claim 1 further comprising:

cross coupling means connected between the collector electrode of the first control device and the base electrode of the second control device.

3. The differentiator circuit of claim 2 wherein the cross coupling means in a Zener diode.

4. The differentiator circuit of claim 2 wherein the cross coupling means is a capacitor.

References Cited

UNITED STATES PATENTS

| | | | |
|---|---|---|---|
| 2,641,717 | 6/1953 | Toth | 307—88.5 X |
| 2,943,212 | 6/1960 | Hill et al. | 307—88.5 |
| 3,249,767 | 5/1966 | Zeller | 307—88.5 |

OTHER REFERENCES

Electronic Products, December 1960, page 35.

JOHN S. HEYMAN, *Primary Examiner.*

DONALD D. FORRER, *Assistant Examiner.*